United States Patent

Kinoshita et al.

[11] Patent Number: 5,971,017
[45] Date of Patent: Oct. 26, 1999

[54] INLET PIPE STRUCTURE

[75] Inventors: Shinsuke Kinoshita; Takeshi Kasuya, both of Aichi-ken, Japan

[73] Assignees: Toyota Jidosha Kabushiki Kaisha; Horie Kinzoku Kogyo Kabushiki Kaisha, both of Toyota, Japan

[21] Appl. No.: 08/973,519
[22] PCT Filed: Apr. 9, 1997
[86] PCT No.: PCT/JP97/01209
 § 371 Date: Dec. 5, 1997
 § 102(e) Date: Dec. 5, 1997
[87] PCT Pub. No.: WO97/38871
 PCT Pub. Date: Oct. 23, 1997

[30] Foreign Application Priority Data

Apr. 16, 1996 [JP] Japan .................................. 8-094418

[51] Int. Cl.⁶ .................................................. B65D 25/00
[52] U.S. Cl. .......................... 137/588; 137/265; 123/516
[58] Field of Search .............................. 123/516; 137/255, 137/265, 588

[56] References Cited

U.S. PATENT DOCUMENTS

| 2,703,607 | 3/1955 | Simmonds | 137/265 |
| 4,765,359 | 8/1988 | Burnett | 137/255 |
| 5,036,823 | 8/1991 | MacKinnon | 123/516 |

FOREIGN PATENT DOCUMENTS

| 50-147020 | 12/1975 | Japan . |
| 52-98020 | 1/1977 | Japan . |
| 52-87574 | 7/1977 | Japan . |
| 61-24318 | 2/1986 | Japan . |
| 62-1633 | 1/1987 | Japan . |
| 2-42817 | 3/1990 | Japan . |
| 3-17398 | 2/1991 | Japan . |
| 3-79431 | 4/1991 | Japan . |

OTHER PUBLICATIONS

"Fuel Inlet Switching Structure", Technical Review Published by Japan Patent Information Organization, Publication No. 87–14727, Published on Nov. 20, 1987.

Primary Examiner—A. Michael Chambers
Attorney, Agent, or Firm—Burns, Doane, Swecker & Mathis, LLP

[57] ABSTRACT

There is provided an inlet pipe structure which does not require a liquid-level monitoring device or the like. A fuel tank (10) is formed by a main tank (12) and a sub-tank (14). A branch body (28) is connected to a fueling port (26) and an end (24A) of a fueling gun (24) can be selectively inserted into branch openings (32, 33) of the branch body (28). A connecting portion (34A) of the sub-breather tube (34) is fixed inclining toward the main tank (12) to a main tank inlet pipe (16) connected to a branch opening (32) of the branch body (28) at a position near an end portion (16B) of the main tank inlet pipe (16). Further, a connecting portion (36A) of a main breather tube (36) is fixed inclining toward the sub-tank (14) to a sub-tank inlet pipe (20) connected to a branch opening (33) of the branch body (28) at a position near an end portion (20B) of the sub-tank inlet pipe (20).

4 Claims, 4 Drawing Sheets

INLET PIPE STRUCTURE

FIELD OF THE INVENTION

The present invention relates to an inlet pipe structure, and particularly to an inlet pipe structure provided in a vehicle having a plurality of fuel tanks.

BACKGROUND ART

Conventionally, there has been known an inlet pipe structure which is provided in a vehicle such as an automobile having a plurality of fuel tanks, and an example thereof is disclosed in Japanese Patent Application Laid-Open (JP-A) No. 3-79431.

Further, there has also been proposed a technique in which a main tank 71 and a sub-tank 75 are each formed as a separate body in a state of being not connected by a communicating pipe and an inlet pipe 90 is branched into two pipes 90A, 90B, one inlet pipe 90A being connected to the main tank 71 and another inlet pipe 90B being connected to the subtank 75, in order to secure fuel during long-distance traveling (see FIG. 4). However, for example, when the sub-tank 75 is in a full-filled state, peripheral atmosphere heat and heat of returned fuel from an engine cause a fuel 81 within the sub-tank 75 to be heated and vapor (vaporized fuel) is generated, thereby resulting in an increase in the internal pressure of the sub-tank 75. Accordingly, in order to prevent a liquid surface of the fuel 81 in the sub-tank 75, flowing through a breather tube 94 connected to the sub-tank 75, from ascending to the vicinity of a fueling port 94, a liquid-level monitoring device 100 needs to be provided additionally. In FIG. 4, reference numerals 96, 98 each designate a check valve.

Techniques relating to the present invention are disclosed in the following publications: Japanese Patent Application Laid-Open (JP-A) No. 52-87574 in which a communicating pipe is provided between a main tank and a sub-tank; Japanese Utility Model Application Laid-Open (JP-U) No. 61-24318 in which an inlet pipe is disposed at a position above a fuel level even in an inclined state; Japanese Utility Model Application Laid-Open (JP-U) No. 2-42817 in which a baffle plate for preventing back flow of fuel is provided at a breather opening portion; Japanese Utility Model Application Laid-Open (JP-U) No. 3-17398 in which a metallic retainer of an inlet pipe is formed by press molding and the number of parts is thereby reduced; and the technical review published by Japan Patent Information Organization No. 87-14727 in which fueling-gun insertion openings are respectively provided for a main tank and a sub-tank.

DISCLOSURE OF THE INVENTION

In view of the above-described circumstances, it is an object of the present invention to provide an inlet pipe structure without causing an increase in the number of parts such as a liquid-level monitoring device and having a low-cost and simple structure.

In accordance with the present invention, there is provided an inlet pipe structure comprising: a branch portion which is connected to a fueling port and has a plurality of branch openings into which an end of a fueling gun can be selectively inserted; a plurality of inlet pipes which each connect one of the plurality of branch openings to one of a plurality of fuel tanks each being formed as a separate body; and a breather tube of which one end portion is connected to at least one of the plurality of fuel tanks and of which another end portion is connected to at least one of the plurality of inlet pipes, which is connected to other fuel tank, at a position near the branch opening of the inlet pipe, wherein a portion of the breather tube which is connected to the inlet pipe connected to the other fuel tank is fixed to the inlet pipe in such a manner as to be inclined toward the other fuel tank.

Accordingly, for example, in a case in which one of the plurality of fuel tanks connected by the breather tube and the inlet pipes is in a full-filled state and the other tank in an empty state is fed with fuel, when an internal pressure of the full-filled fuel tank increases, the liquid level of fuel within the full-filled fuel tank moves upward toward the fueling port via the breather tube. The upward fuel is fed from the breather tube into the inlet pipe connected to the empty fuel tank. At this time, since a portion of the breather tube which is connected to the inlet pipe is fixed to the inlet pipe inclining toward the empty fuel tank, the upward fuel flows toward the empty fuel tank through the inlet pipe.

As described above, in the present invention, the portion of the breather tube which is connected to the inlet pipe is fixed to the inlet pipe so as to be inclined toward the fuel tank, and therefore, the inlet pipe structure can be provided which has a simple and low-cost structure without needing the above-described liquid-level monitoring device.

DESCRIPTION OF THE PREFERRED EMBODIMENTS

Figure 1:
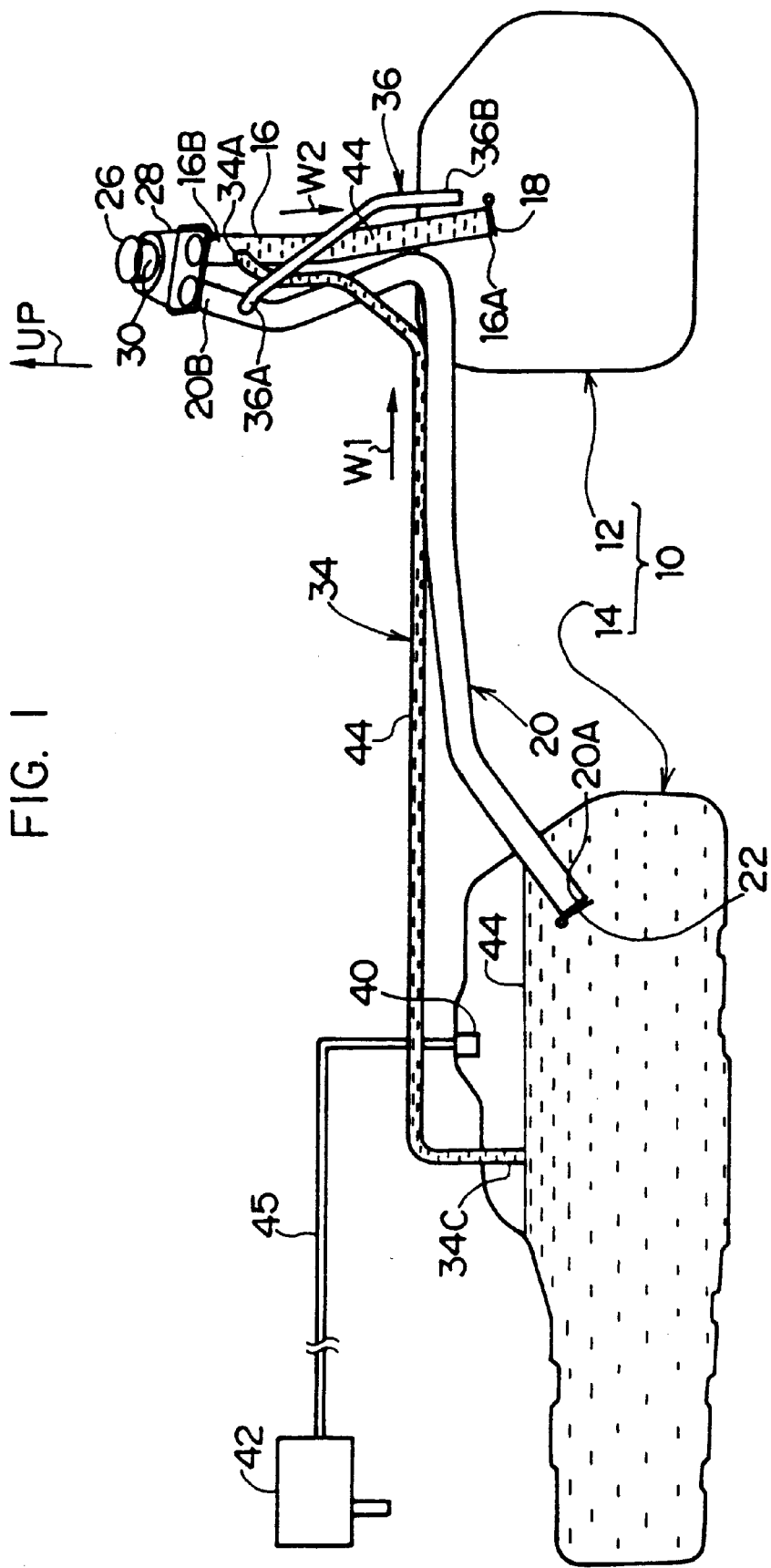
FIG. 1 is a schematic transverse cross-sectional view showing an inlet pipe structure according to an embodiment of the present invention.
Figure 2:
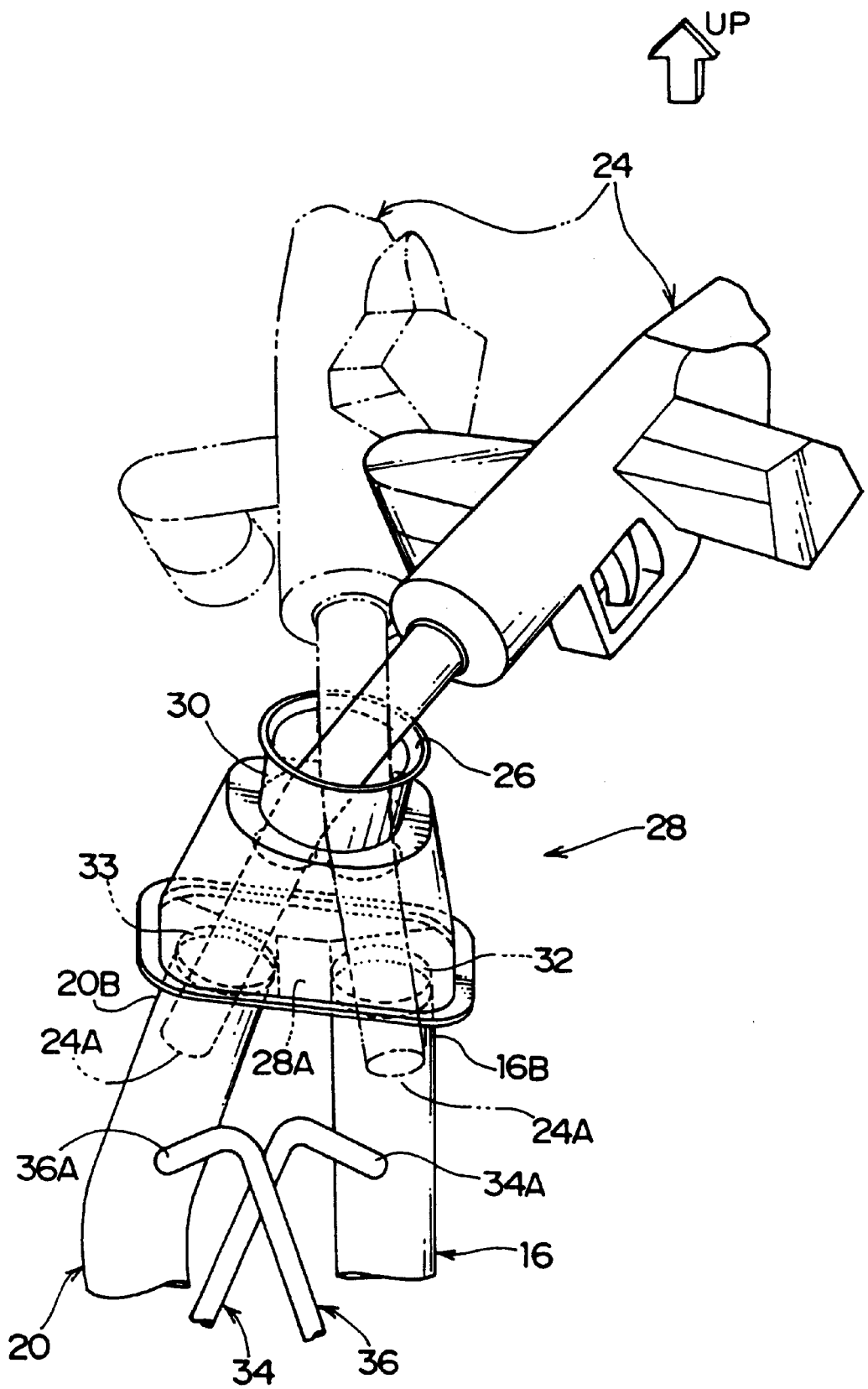
FIG. 2 is a perspective view showing a fueling port and its vicinities of the inlet pipe structure according to the embodiment of the present invention.
Figure 3:
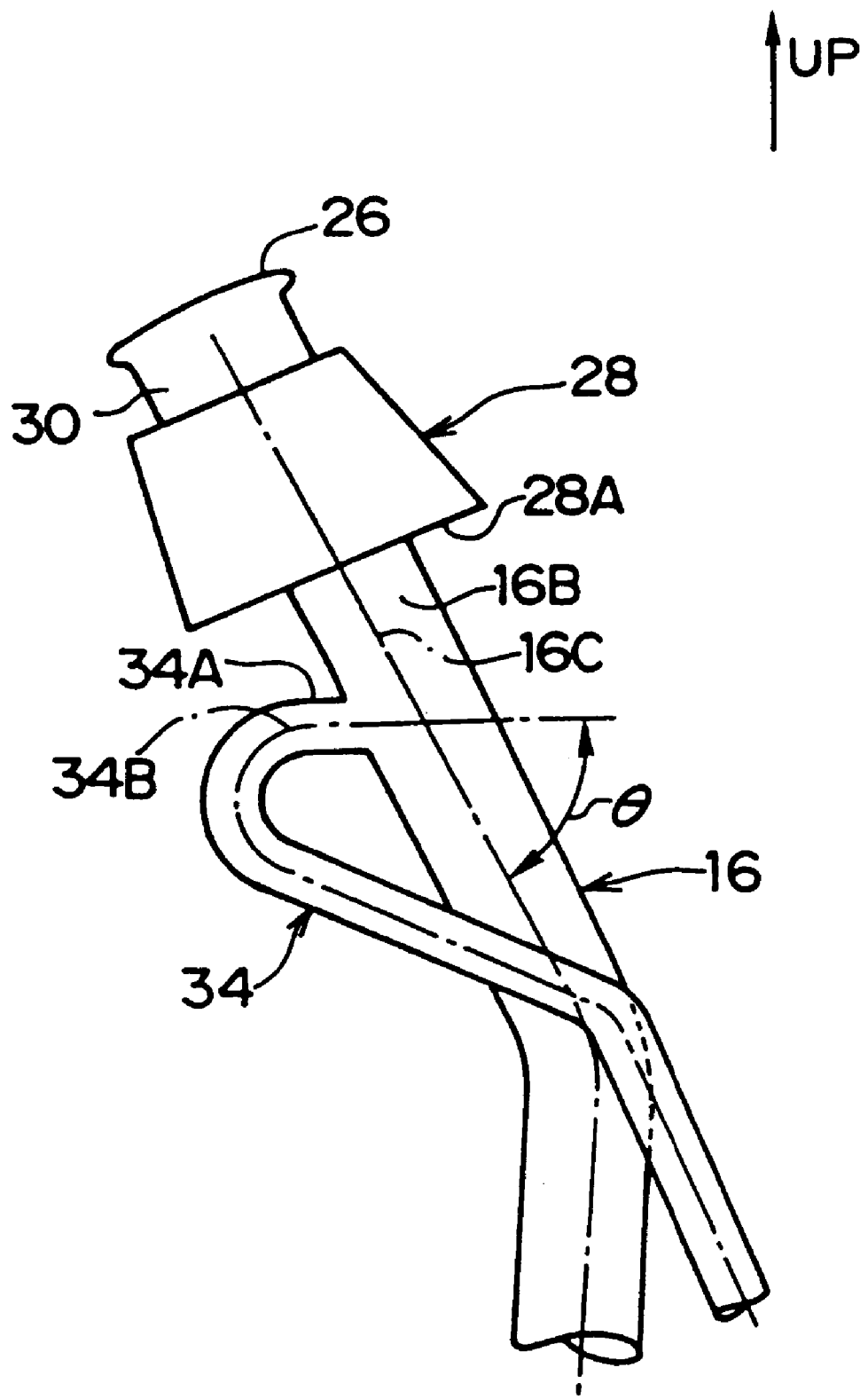
FIG. 3 is a schematic transverse cross-sectional view showing the fueling port and its vicinities of the inlet pipe structure according to the embodiment of the present invention.
Figure 4:
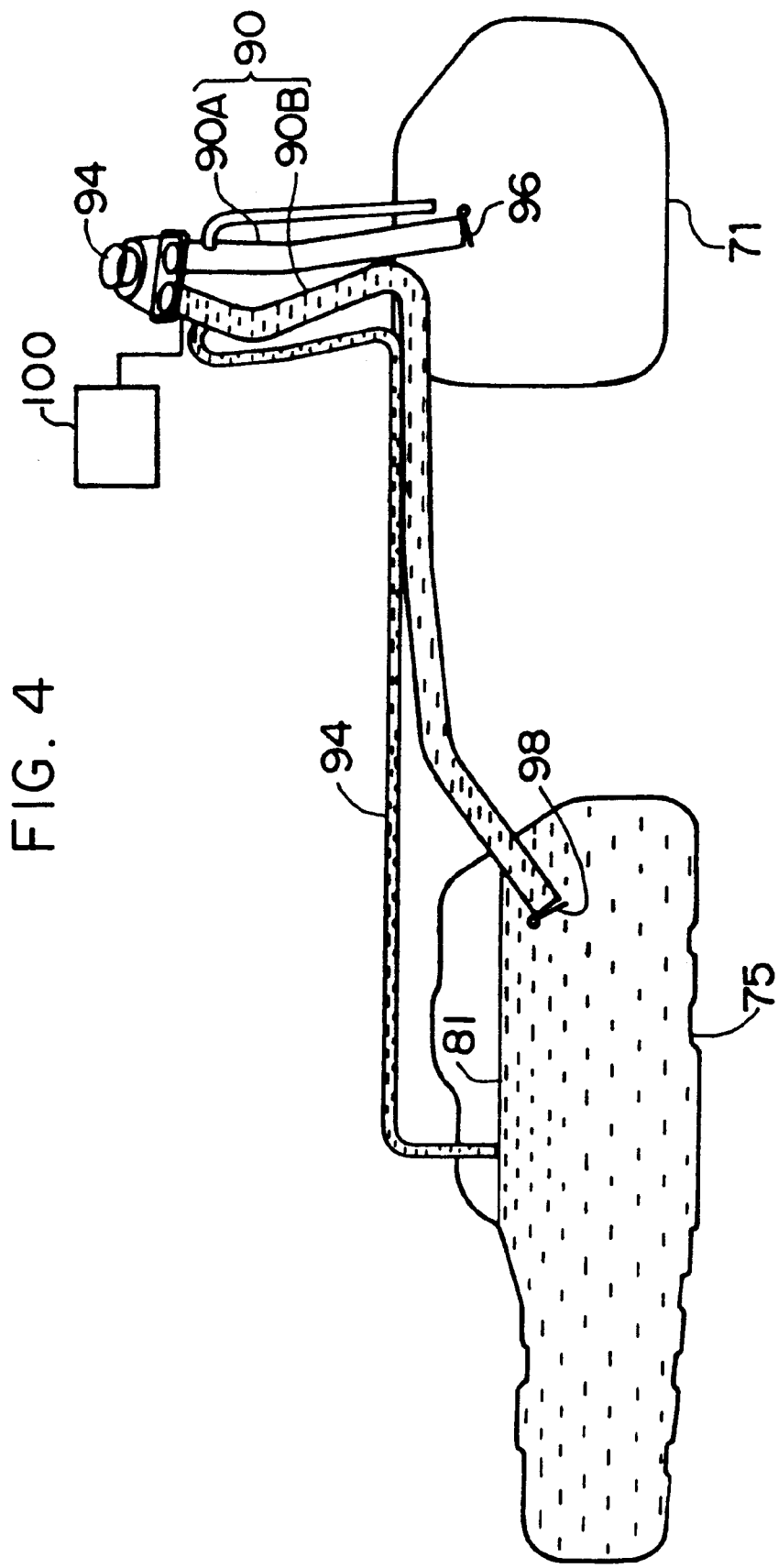
FIG. 4 is a schematic transverse cross-sectional view showing a conventional inlet pipe structure.

Referring now to FIGS. 1 through 3, an inlet pipe structure according to an embodiment of the present invention will be described hereinafter. Note that an arrow "UP" shown in these drawings represents an upward direction of a vehicle.

As shown in FIG. 1, in the present embodiment, a fuel tank 10 is formed by a main tank 12 and a sub-tank 14, and the main tank 12 and the sub-tank 14 are each formed as a separate body without being connected by a communicating pipe.

A main tank inlet pipe 16 is provided to pass through a side wall portion of the main tank 12 and one end portion 16A of the main tank inlet pipe 16 is inserted into the main tank 12. Further, a check valve 18 is mounted at the end portion 16A of the main tank inlet pipe 16.

A sub-tank inlet pipe 20 is provided to pass through a side wall portion of the sub-tank 14 and one end portion 20A of the sub-tank inlet pipe 20 is inserted into the sub-tank 14. Further, a check valve 22 is mounted at the end portion 20A of the sub-tank inlet pipe 20.

As shown in FIG. 2, a branch body 28 serving as a branch portion is connected to a fueling port 26 in which a fueling gun 24 is inserted when fueling. The branch body 28 is made by press working to have a trapezoidal shape in which a cap hardware 30 having the fueling port 26 is formed integrally with the branch body 28. Further, two branch openings 32, 33 are formed in a bottom portion 28A of the branch body 28, and as indicated by the solid line and the two-dot chain line in FIG. 2, an end 24A of the fueling gun 24 can be selectively inserted into the branch openings 32, 33.

Another end portion 16B of the main tank inlet pipe 16 is connected to the branch opening 32 of the branch body 28 and another end portion 20B of the sub-tank inlet pipe 20 is connected to the branch opening 33 of the branch body 28.

As shown in FIG. 3, a connecting portion 34A which is one end portion of a sub-breather tube 34 is connected to the main tank inlet pipe 16 at a position near the end portion 16B of the main tank inlet pipe 16. At a portion of the sub-breather tube 34 which is connected to the main tank inlet pipe 16, an angle θ made by an axial line 34B of the connecting portion 34A of the sub-breather tube 34 and an axial line 16C of the main tank inlet pipe 16 is formed as an acute angle. The connecting portion 34A of the sub-breather tube 34 is fixed to the main tank inlet pipe 16 in such a manner as to be inclined toward the main tank.

As shown in FIG. 2, a connecting portion 36A which is one end portion of a main breather tube 36 is connected to the sub-tank inlet pipe 20 at a position in the vicinity of the end portion 20B. Meanwhile, although not being illustrated, at a portion of the main breather tube 36 which is connected to the sub-tank inlet pipe 20, an angle made by an axial line of the connecting portion 36A of the main breather tube 36 and an axial line of the sub-tank inlet pipe 20 is formed as an acute angle. The connecting portion 36A of the main breather tube 36 is fixed to the sub-tank inlet pipe 20 so as to be inclined toward the subtank.

As shown in FIG. 1, another end portion 34C of the sub-breather tube 34 is provided to pass through an upper wall portion of the sub-tank 14 so as to be inserted into an upper portion of the sub-tank 14. Further, another end portion 36B of the main breather tube 36 is provided to pass through an upper wall portion of the main tank 12 so as to be inserted into an upper portion of the main tank 12. In addition, a canister 42 is connected via a vapor line 45 to a valve unit 40 provided at the upper wall portion of the sub-tank 14.

Next, an operation of the present embodiment will be described.

In the present embodiment, for example, in the case of fueling for the main tank 12, as indicated by the two-dot chain line in FIG. 2, the end 24A of the fueling gun 24 is inserted from the fueling port 26 into the branch opening 32 of the branch body 28.

In this case, as shown in FIG. 1, when the sub-tank 14 is in a full-filled state, peripheral atmosphere heat and heat of returned fuel from an engine cause the fuel 44 within the sub-tank 14 to be heated and vapor is thereby generated. As a result, internal pressure of the sub-tank 14 increases and the fuel 44 within the sub-tank 14 is pushed out therefrom through the sub-breather tube 34 to be moved toward the fueling port 26 (i.e., the direction indicated by arrow W1 in FIG. 1).

Further, in the present embodiment, as shown in FIG. 3, the sub-breather tube 34 is connected to the main tank inlet pipe 16 and the connecting portion 34A of the sub-breather tube 34 is fixed to the main tank inlet pipe 16 so as to be inclined toward the main tank. Accordingly, as shown in FIG. 1, the fuel 44 moving within the sub-breather tube 34 is pushed out into the main tank inlet pipe 16 to the side of the main tank 12 and moves through the main tank inlet pipe 16 toward the main tank 12 (i.e., the direction indicated by arrow W2 in FIG. 1) to flow into the main tank 12.

On the other hand, in the case of fueling for the sub-tank 14, as indicated by the solid line in FIG. 2, the end 24A of the fueling gun 24 is inserted from the fueling port 26 into the branch opening 33 of the branch body 28.

In this case as well, the main breather tube 36 is connected to the sub-tank inlet pipe 20 and the connecting portion 36A of the main breather tube 36 is fixed to the sub-tank inlet pipe 20 so as to be inclined toward the sub-tank. For this reason, in the same way as in the case of fueling for the main tank 12, the fuel moving from the full-filled main tank 12 through the main breather tube 36 is pushed out into the sub-tank inlet pipe 20 to the side of the sub-tank 14 and moves toward the sub-tank 14 to flow into the sub-tank 14.

As a result, with the inlet pipe structure of the present embodiment, when a fuel cap is opened at the time of fueling or the like, the liquid level of fuel can be prevented from ascending to the vicinity of the fueling port without using the liquid-level monitoring device. For this reason, the number of parts can be reduced and complication of a device structure and an increase in cost can be prevented.

In the foregoing, the present invention was described in detail with reference to a specified embodiment, but it is not limited to the same. It will become clear to those skilled in the art that other various modifications may be made within the scope of the invention as hereinafter claimed. For example, in the present embodiment, the fuel tank 10 is formed by two fuel tanks: the main tank 12 and the sub-tank 14. However, the fuel tank 10 may also be formed by three or more tanks, to which inlet pipes are connected via a branch body having three or more branch openings, and a breather tube may be connected to each of the inlet pipes.

INDUSTRIAL AVAILABILITY

As described above, the present invention can provide a low-cost inlet pipe structure having a simple structure, and therefore, in this age of automobile, the above inlet pipe structure is extremely effective in the vehicle industry.

We claim:

1. An inlet pipe structure comprising:

a branch portion which is connected to a fueling port and has a plurality of branch openings into which an end of a fueling gun can be selectively inserted;

a plurality of inlet pipes which each connect one of the plurality of branch openings to one of a plurality of fuel tanks each being formed as a separate body; and a breather tube of which one end portion is connected to at least one of the plurality of fuel tanks and of which another end portion is connected to at least one of the plurality of inlet pipes, which is connected to other fuel tank, at a position near the branch opening of the inlet pipe, for preventing a liquid level of fuel from ascending to the vicinity of a fueling port, wherein a portion of said breather tube which is connected to the inlet pipe connected to the other fuel tank is fixed to the inlet pipe in such a manner as to be inclined toward the other fuel tank.

2. An inlet pipe structure according to claim 1, wherein an axial line of the connecting portion of said breather tube makes an acute angle with respect to an axial line of the inlet pipe at a position near the connecting portion.

3. An inlet pipe structure according to claim 1, wherein when one of the plurality of fuel tanks is brought into a full-filled state, fuel within the fuel tank can flow from said breather tube via the connecting portion into the inlet pipe connected to the other fuel tank.

4. An inlet pipe structure according to claim 3, wherein the fuel flowing into the inlet pipe is moved toward the other fuel tank through the inlet pipe.

* * * * *